United States Patent [19]

Delvecchio et al.

[11] Patent Number: 5,790,022

[45] Date of Patent: Aug. 4, 1998

[54] SECURITY TRACKING SYSTEM

[76] Inventors: George Delvecchio, 8511 NW. 82nd St., Tamarac, Fla. 33321; Maurice E. Moore, Jr., 1120 Empire Central Pl. #200, Dallas, Tex. 75247

[21] Appl. No.: 711,118

[22] Filed: Sep. 9, 1996

[51] Int. Cl.$^6$ .................................................. G08B 1/08
[52] U.S. Cl. .......................... 340/539; 340/572; 340/573; 340/825.36; 340/825.49
[58] Field of Search ........................... 340/539, 518, 340/571, 572, 573, 825.36, 825.37, 825.49

[56] References Cited

U.S. PATENT DOCUMENTS 5,218,344  6/1993  Ricketts ........................ 340/573
5,525,967  6/1996  Azizi et al. .................... 340/573

Primary Examiner—Jeffrey Hofsass
Assistant Examiner—Daryl C. Pope

[57] ABSTRACT

A security tracking system including a transmitter adapted to transmit a signal upon the actuation of an activation means by a user. An antenna is adapted to receive the signal via free space. Also included is a receiver coupled to the antenna and adapted to generate discrete compass point data from the signal. Coupled to the receiver is a processor adapted to calculate from the discrete compass point data a location of the transmitter. A mapping mechanism, video monitoring mechanism, alarm, telecommunication mechanism, and adjustable light are governed by the processor to afford both emergency and non-emergency utility.

17 Claims, 5 Drawing Sheets

SECURITY TRACKING SYSTEM

BACKGROUND OF THE INVENTION

1. Field of the Invention

The present invention relates to a security tracking system and more particularly pertains to tracking and identifying a user by actuating a transmitter module within a local designated area for providing both emergency and non-emergency service.

2. Description of the Prior Art

The use of security systems is known in the prior art. More specifically, security systems heretofore devised and utilized for the purpose of preventing crimes are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,764,757 to DeMarco et al. a security detection and location system with independent local alarm and communications circuits. The security detection and location system includes a plurality of monitoring stations that are spaced from each other. Each monitoring station includes its own solar rechargeable battery, a receiver, an alarm circuit and a communication device such as a telephone dealer or a radio frequency transmitter. The security system operates in conjunction with a plurality of portable transmitters that can be actuated to transmit a distress signal by a person carrying one of the transmitters. When the portable transmitter issues a distress signal, the receiver in a monitoring station issues a command signal which activates two independent circuits, the alarm circuit and the communications circuit. The alarm circuit generates an audible sound in the locale of the monitoring station and the communications circuit sends a signal unique to that monitor to a central response or control unit.

U.S. Pat. No. 5,225,809 to Bunn discloses a personal security system and apparatus therefor. The personal security system and process include personal transmitters capable of selectively transmitting one or more radio signals at a desired frequency. The signals represent the particular character of service that is desired. A number of antenna/transmitters are located in evenly spaced relation in the geographical area and correspond to a computer grid work of the geographical area. The antenna/transmitters receive signals having X and Y axes from the personal transmitters, amplify the signals and transmit them to signal processing equipment. The signal processing equipment includes an automatic direction finding circuit capable of receiving the X and Y axes components of the personal transmitter signal and the vertical elevation of the signal in order to yield an ADF signal output reflecting the location of the signal. The ADF output signal is then processed by means of a computer such that the signal is displayed on a cathode ray tube impressed with a map of the geographical area and the antenna grid work to thus display a signal representing the position of the personal transmitter on a grid of the geographical area. This signal can be further processed to locate the personal transmitter on a small portion of the grid work to thus provide service personnel with the capability of efficiently locating and servicing the signal transmitting customer's needs.

Lastly, U.S. Pat. No. 4,157,540 to Oros; U.S. Pat. No. 4,602,357 to Yang; U.S. Pat. No. 5,003,294 to Mason; and U.S. Pat. No. 5,115,224 to Kostusiak are provided as being of general interest.

In this respect, the security tracking system according to the present invention substantially departs from the conventional concepts and designs of the prior art, and in so doing provides an apparatus primarily developed for the purpose of tracking and identifying a user by actuating a transmitter module within a local designated area for providing both emergency and non-emergency service.

Therefore, it can be appreciated that there exists a continuing need for a new and improved security tracking system which can be used for tracking and identifying a user by actuating a transmitter module within a local designated area for providing both emergency and non-emergency service. In this regard, the present invention substantially fulfills this need.

SUMMARY OF THE INVENTION

The present invention is a security tracking device which overcomes many of the disadvantages found in the prior art devices. A user can carry the device, and if needed, trigger it. The device has a transmitter which allows the position of the user to be continually tracked. If the unit is triggered, various responses can be activated. For example, sirens can blare and lights can be aimed towards the unit. Further, security guards can be dispatched to the exact location of the user.

To attain this, the present invention essentially comprises a plurality of transmitter modules. Each transmitter module comprises a transmitter adapted to transmit a first radio frequency upon the actuation of a first activation mechanism and a second radio frequency upon the actuation of a second activation mechanism. Each transmitter module also includes a microphone for transmitting audio signals received therefrom via free space upon the actuation of the first activation mechanism. For identification purposes, each module is adapted to transmit an identification code upon the actuation of the first activation mechanism or second activation mechanism. As shown in FIGS. 1 & 5, a plurality of direction finding antennas are adapted to receive a multiplicity of radio frequencies via free space. The antennas each comprise a plurality of dipoles operatively coupled in pairs. Each pair is connected to an impedance matching mechanism for converting a first impedance of each dipole to a second lower impedance and further allowing the passage of the received radio frequencies therethrough. Also included is a summer operatively coupled between the impedance matching mechanism of each of the antennas and a coaxial cable. The summer is adapted to alternately actuate the pairs of dipoles in a rotating sequence at a predetermined rate. The summer is further adapted to gauge the signal intensity upon each actuation and further generate a time dependent accumulation of the signal intensities in the form of an analog signal. The summer is further connected to a direct current power supply for the powering thereof. As best shown in FIGS. 1 & 6, a direction finding processor is coupled to each summer via the coaxial cable. The direction finding processor is adapted to sample the analog signal and generate discrete compass point data. A computer comprising a processing mechanism is connected to a plurality of serial input ports each with an associated driver operatively coupled thereto. Each serial input port is coupled to one of the direction finding processors for accepting the discrete compass point data therefrom and further allowing the transmission thereof to the processing mechanism. The processing mechanism is adapted to obviate erratic data from a predetermined array of the compass point data thus providing an accurate array. The processing mechanism is further adapted to average the accurate array thereby affording a plot point defining a point in space between the transmitter module and the antenna. The processing mechanism thereby calculates multiple plot points defining a vector path originating at the antennas. In order to identify which transmitter module has actuated, the processing mechanism is further adapted to receive and differentiate between the identification codes transmitted via the transmitter modules. A mapping mechanism is coupled to the computer for depicting a map of the designated area and further displaying the vector path thereon upon the actuation of the either the first or second actuation mechanism. A video monitoring mechanism is coupled to the computer for viewing and recording the vector path upon the actuation of either the first or second actuation mechanism. An audio monitoring mechanism is coupled to the computer for listening to and recording audio signals emitted in the vector path upon the actuation of the first actuation mechanism. A telecommunication mechanism is included for connecting via a telephone line to a receiver telephone and further providing an emergency audio message upon the actuation of the first activation mechanism. Also included is an alarm mechanism for emitting an audible alarm upon the actuation of the first activation mechanism. For illuminating the vector path upon the actuation of either the first or second activation mechanism, an adjustable lighting mechanism is included.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved security tracking system which has all the advantages of the prior art security systems and none of the disadvantages.

It is another object of the present invention to provide a new and improved security tracking system which may be easily and efficiently manufactured and marketed.

It is a further object of the present invention to provide a new and improved security tracking system which is of a durable and reliable construction.

An even further object of the present invention is to provide a new and improved security tracking system which is susceptible of a low cost of manufacture with regard to both materials and labor, and which accordingly is then susceptible of low prices of sale to the consuming public, thereby making such security tracking system economically available to the buying public.

Still yet another object of the present invention is to provide a new and improved security tracking system which provides in the apparatuses and methods of the prior art some of the advantages thereof, while simultaneously overcoming some of the disadvantages normally associated therewith.

Still another object of the present invention is to track and identify a user by actuating a transmitter module within a local designated area for providing both emergency and non-emergency service.

Lastly, it is an object of the present invention to provide a new and improved security tracking system including a transmitter adapted to transmit a signal upon the actuation of an activation means by a user. An antenna is adapted to receive the signal via free space. Also included is a receiver coupled to the antenna and adapted to generate discrete compass point data from the signal. Coupled to the receiver is a processor adapted to calculate from the discrete compass point data a location of the transmitter. A mapping mechanism, video monitoring mechanism, alarm, telecommunication mechanism, and adjustable light are governed by the processor to afford both emergency and non-emergency utility.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
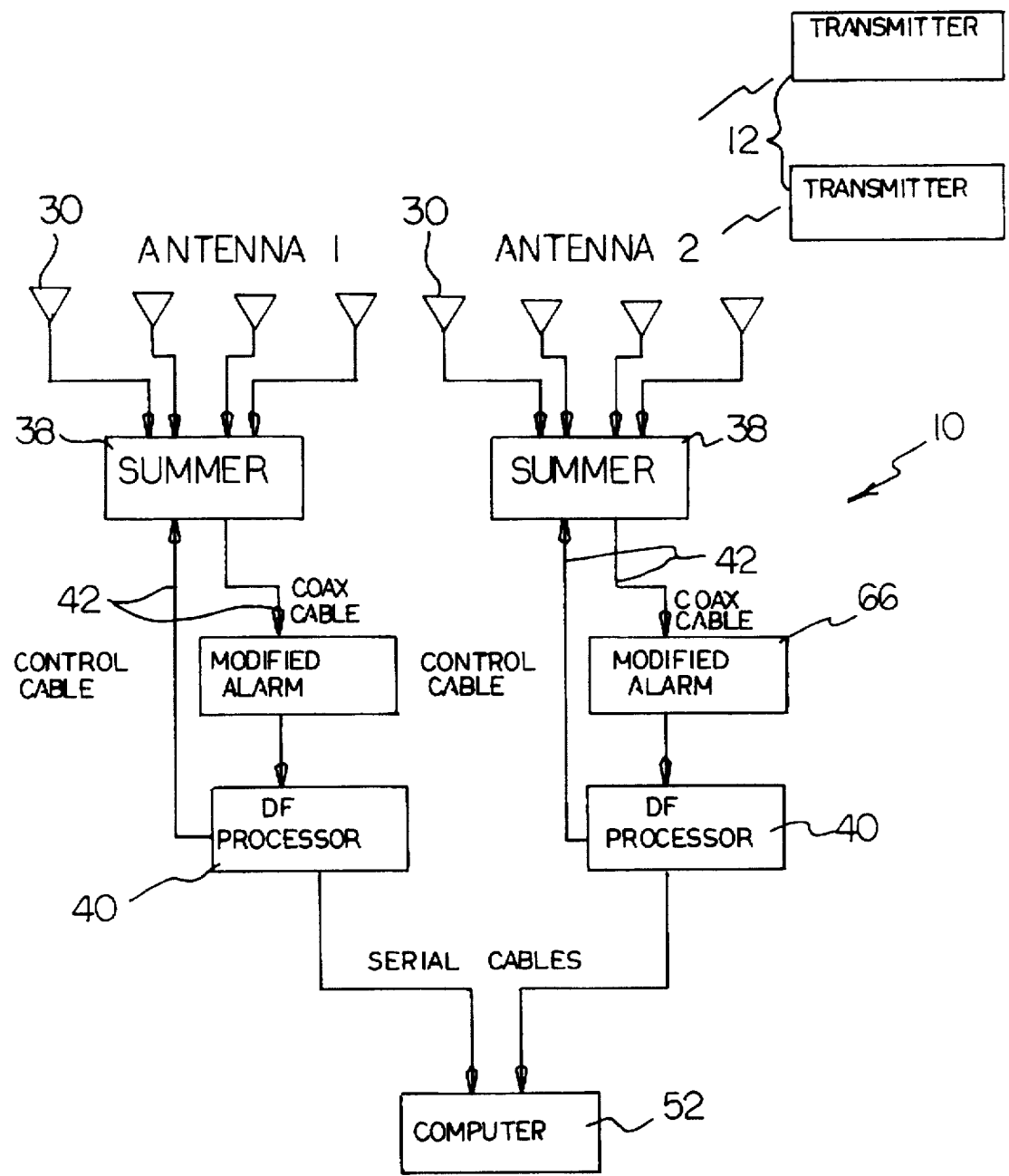
FIG. 1 is a schematic of the preferred embodiment of the security tracking system constructed in accordance with the principles of the present invention.
Figure 2:
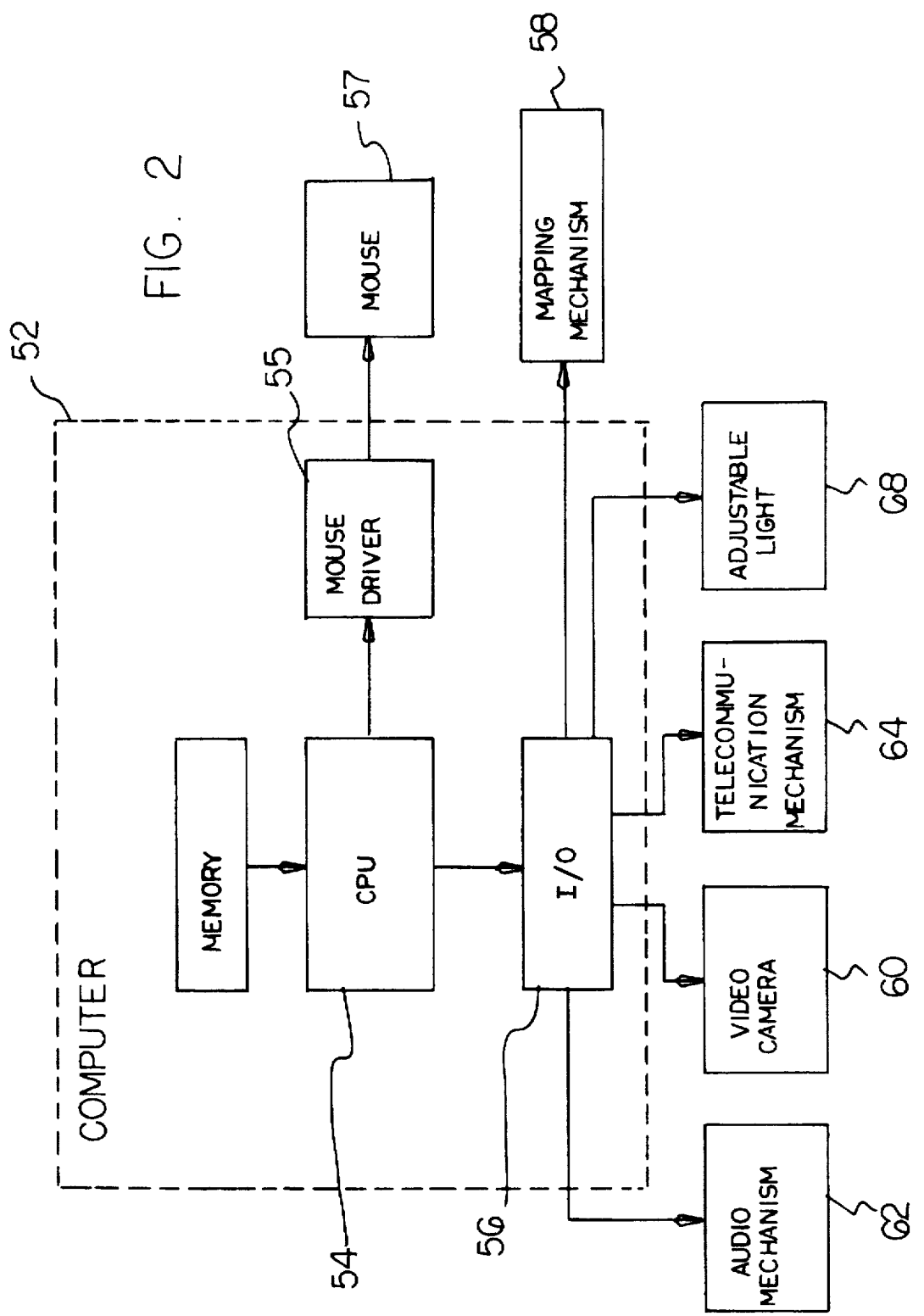
FIG. 2 is a schematic of the computer employed in the present invention.

With reference now to the drawings, and in particular to FIG. 1 thereof, a new and improved security tracking system embodying the principles and concepts of the present invention and generally designated by the reference numeral 10 will be described.

The present invention, the new and improved security tracking system, is comprised of a plurality of components. Such components in their broadest context include a plurality of transmitter modules, direction finding antennas, summer, direction finding processor, computer, mapping mechanism, video monitoring mechanism, audio monitoring mechanism, alarm mechanism, telecommunication mechanism, and adjustable lighting mechanism. Such components are individually configured and correlated with respect to each other so as to attain the desired objective.

More specifically, it will be noted that the system 10 of the present invention includes a plurality of transmitter modules 12. The transmitter modules are included for allowing a user to draw attention to himself and further allow others to identify the location thereof. Additionally, the transmitters are adapted to initiate a plurality of predetermined consequences as will be described later. Each transmitter module is portable and comprises a transmitter adapted to transmit a first radio frequency via free space upon the actuation of a first activation mechanism 14 and a second radio frequency via free space upon the actuation of a second activation mechanism 16. Both radio frequencies are approximately 300 Mhz so as to allow the transmission thereof over great distances, in adverse weather conditions, and further through objects such as vehicles, buildings and the like. Ideally, both activation mechanisms comprise push button switches easily actuated upon the depression thereof. Each transmitter module also includes a microphone 18 for transmitting audio signals received therefrom via a radio frequency upon the actuation of the first activation mechanism. For identification purposes, each module is adapted to transmit an identification code upon the actuation of either the first activation mechanism or second activation mechanism.

Figure 3:
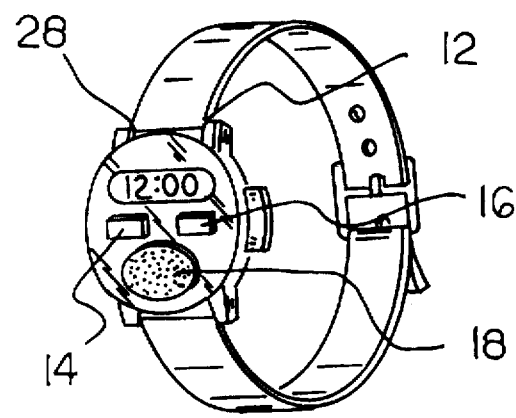
FIG. 3 is a perspective view of an alternate embodiment of the transmitter module.
Figure 4:
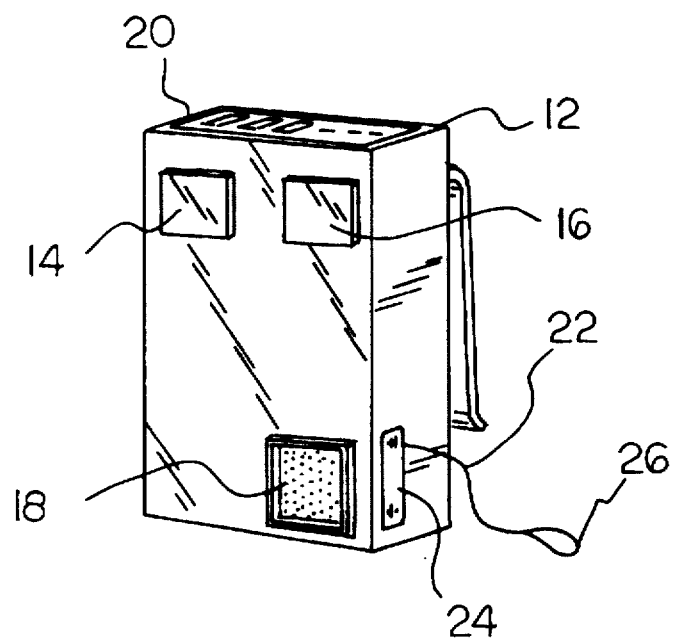
FIG. 4 is a perspective view of the preferred embodiment of the transmitter module.

Preferably, as shown in FIG. 4, the transmitter module takes the form of a conventional pager 20 with the microphone situated on a front face thereof. The pager also includes a pull cord 22 with a plug 24 end adapted to be releasably coupled to the pager and further a loop end 26 adapted to be attached to an article of clothing or body part. In a struggle, the plug is adapted to be removed, thereby actuating the first activation mechanism. In a second embodiment, as best shown in FIG. 3, a watch structure 28 is employed as a transmitter module. Additionally, the transmitter modules are each adapted to emit a siren therefrom upon the actuation of the first mechanism to deter a perpetrator. Ideally, DC power, in the form of batteries, is employed for powering purposes. The design of the transmitters of each of the embodiments precludes the deactivation thereof unless the batteries are removed. In the preferred embodiment, the removal of the batteries is a lengthy process which would be impossible to accomplish by a perpetrator.

Figure 5:
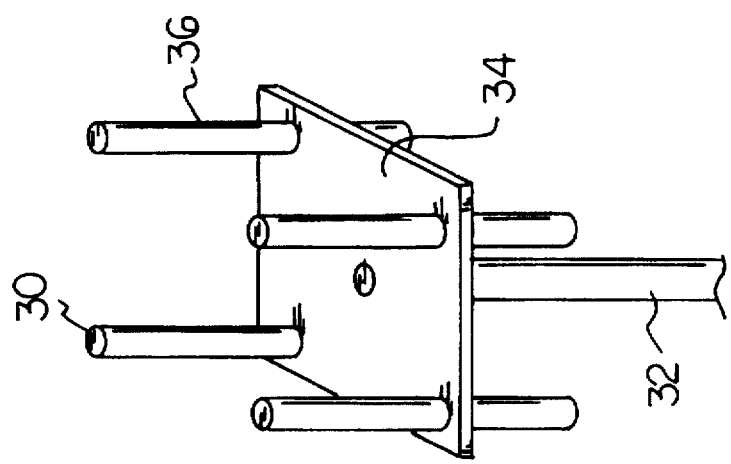
FIG. 5 is a perspective view of the antenna of the present invention.

As shown in FIGS. 1 & 5, a plurality of direction finding antennas 30 are adapted to receive a multiplicity of radio frequencies via free space. At least two of such antennas are provided in order to allow for direction finding capability. The antennas are suitably situated on a post 32 which are evenly distributed about the local designated area. The antennas each comprise a plurality of dipoles operatively coupled in pairs. Each pair is connected to an impedance matching mechanism for converting a first impedance of each dipole to a second lower impedance and further allowing the passage of the received radio frequencies therethrough. It should be noted that circuitry associated with the antenna is included to facilitate the antenna to be tuned to the frequency of transmission of the operator hand-held device. In the preferred embodiment as shown in FIG. 5, four poles are set initially to point at teh major ordinates of a compass rose, that is N, E, S, W.

Mechanically, the antennas each consist of a rectangular plate 34 coupled to the post in a horizontal orientation. An antenna in form of a rod 36 is vertically coupled to each corner of the rectangular plate, wherein each antenna extends both above and below the plate.

For monitoring each of the aforementioned dipoles consecutively for the receipt of any signal at the correct frequency, a summer 38 is operatively coupled between the impedance matching mechanism of each of the antennas and a coaxial cable. Electrically, the summer is adapted to alternately actuate the pairs of dipoles in a rotating sequence at a predetermined rate. Preferably, the summer actuates the dipoles at a rate of 300 times/second. This stimulates the antenna assembly rotating about its own axis, electrically, to facilitate the process of direction finding the emitting source. The summer is further adapted to gauge the signal intensity upon each actuation and further generate a time dependent accumulation of the signal intensities in the form of an analog signal. From the time dependent accumulation of the signal intensities, a relative compass angle of the received signal is determined. The summer is further connected to a direct current power supply for the powering thereof. A power line from an adjacent light pole may be employed to supply power thereto. Alternatively, a solar panel and associated battery may be situated on the pole and electrically connected to the summer for providing a conservative source of power.

Figure 6:
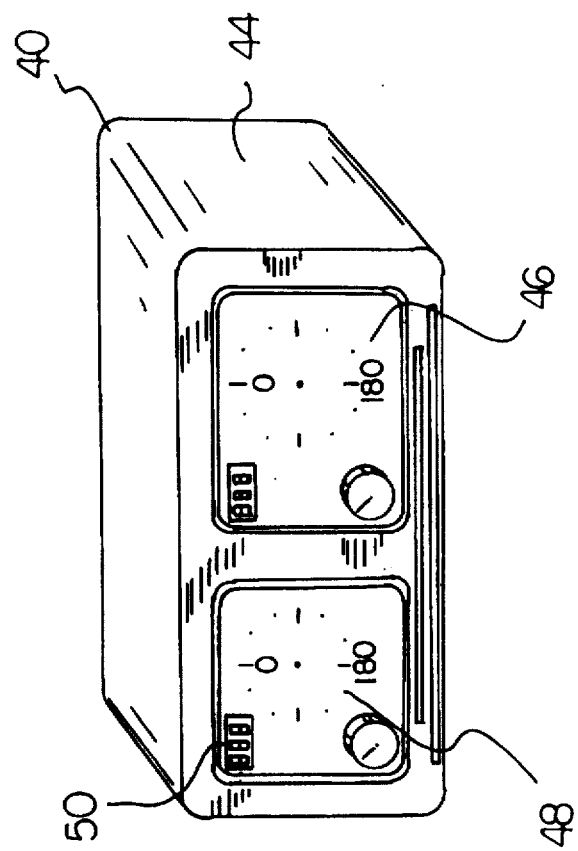
FIG. 6 is a perspective view of the direction finding processor.

As best shown in FIGS. 1 & 6, a direction finding processor 40 is coupled to each summer via the coaxial cable and control cable 42. A direction finding processor is included for each summer. The direction finding processors each include a housing 44 with a front face, a rear face, and a periphery formed therebetween defining an interior space. A compass display 46 is situated on the front face of each direction finding processor for indicating the location of the transmitter with respect to the associated antenna. Each compass display includes an annular array of light emitting diodes 48 each with associated degree indicia. A digital display 50 is also included for providing a more accurate indication of the location of the transmitter by providing an exact angular position relative to the antenna. The direction finding processor is adapted to sample the analog signal and generate discrete compass point data which dictates teh compass angle. It should be noted that the summer and direction finding processor work in conjunction, as what is commonly known as a goniometer, to provide a receiver to both 'wake up the system' and effect the polling of the antennas for relative signal strength data which may be processed as will be described hereinafter.

A computer 52 comprising a processing mechanism 54 is connected to a plurality of serial input ports 56 each with an associated driver operatively coupled thereto. It should be noted that the processing mechanism works in conjunction with software to accomplish the functions to be described later. Each serial input port is coupled to one of the direction finding processors for accepting the discrete compass point data therefrom and further allowing the transmission thereof to the processing mechanism. In an alternate embodiment, such serial input ports are replaced by a modem with an associated driver operatively coupled thereto. The modem is adapted to receive the discrete compass point data via free space from a transmitter coupled to the summer. The processing mechanism is adapted to obviate erratic data from a predetermined array of the compass point data thus providing an accurate array. Such is accomplished by comparing each compass data point with the previous five and allowing the removal thereof if it varies by a predetermined amount preferably about 30%. Upon receiving ten compass data points, the processing mechanism is further adapted to average the accurate array thereby affording a plot point defining a point in space between the transmitter module and the antenna. The processing mechanism thereby calculates multiple plot points defining a vector path originating at the antennas. In order to identify which transmitter module has actuated, the processing mechanism is further adapted to receive and differentiate between the identification codes transmitted via the transmitter modules.

The above mentioned software further provides a plurality of benefits via specially designed code. Such code is adapted to disallow spurious signals, collect a specified amount of transmitted data to eliminate or minimize spurious signals, and smooth out erratic signals. In addition, it is adapted to insure accuracy of initial positioning of the operator and allow significant peripheral events to be a consequence of a correct and true alarm.

Since a multiplicity of peripherals are coupled to the computer due to the required coupling of every antenna, a mouse driver 55 and an associated port is included for allowing the utilization of a conventional mouse 57. Ideally, such port comprises a Microsoft "Bus Mouse" which slaves off a separate expansion card into the mother board and thus frees up one COM port for antennae data.

Alternatively, the transmitter is adapted to continuously transmit the signal upon the actuation of either activation mechanisms. Also, the processing mechanism is adapted to continuously receive compass point data and continuously calculate the location of the transmitter means, thereby allowing the tracking of the transmitter upon the moving thereof.

A mapping mechanism 58 is coupled to the computer for depicting an aerial map of the designated area and further displaying the vector path thereon upon the actuation of either the first or second actuation mechanism. The mapping mechanism may comprise a conventional computer monitor. With the processing mechanism tracking continuously, the mapping direction is adapted to depict each vector path with a width greater than a previous one for discerning therebetween.

Figure 7:
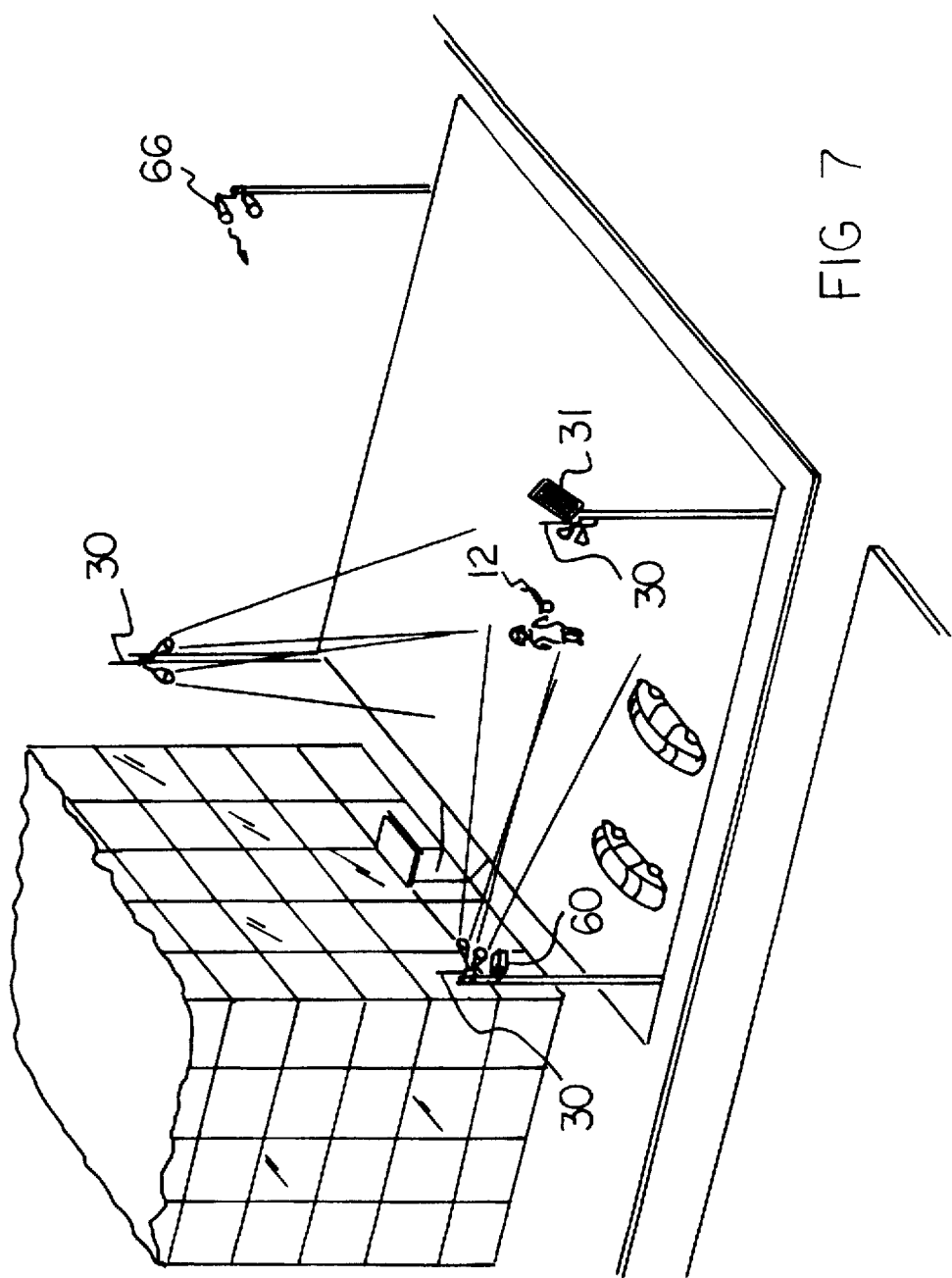
FIG. 7 illustrates a video camera tracking a user with a transmitter module.

A video monitoring mechanism 60 is coupled to the computer for viewing and recording the vector path upon the actuation of either the first or the second actuation mechanism. A video camera pivotally coupled to the post of the antennas in combination with a conventional television screen may be employed for such video mechanism. The orientation of the video camera is governed by the processing mechanism. Optionally, alert messages may be displayed on the screen to indicate to a person monitoring the present system that a transmitter is actuated. FIG. 7 illustrates the video camera 60 tracking a user with a transmitter module 12.

An audio monitoring mechanism 62 is coupled to the computer for listening to and recording audio signals emitted in the vector path upon the actuation of the first actuation mechanism. Such audio signals are transmitted via the microphone of the transmitter.

A telecommunication mechanism 64 is included for connecting via a telephone line to a receiver telephone and further providing an emergency audio message upon the actuation of the first activation mechanism. Preferably, the message is prerecorded and contains critical data such as the location and name of the business utilizing the security system and further the nature of the alarm. Such receiver telephone ideally consists of an official police phone but may also include lines in communication with fire, security, medics, and the like. It should be noted that the emergency audio message may be repeated as required.

Also included is an alarm mechanism 66 for emitting an audible alarm signal upon the actuation of the first activation mechanism. Such alarm is connected between the summer and direction finding processor for immediate actuation.

For illuminating the vector path upon the actuation of either the first or second activation mechanism, an adjustable lighting mechanism 68 is included. The adjustable lighting mechanism preferably comprises a light pivotally coupled to the post of the antenna. The orientation of the light is governed by the processing mechanism. Additionally, perimeter lighting may be utilized in combination with the adjustable lighting mechanism.

In use, the tracking security system affords both emergency and non-emergency utility. Using a single transmitter, a user may, in a non-emergency situation, effect the actuation of the second activation mechanism. When activated in such a mode, the lighting mechanism provides light specifically on the location of the user. The mapping mechanism and video monitoring mechanism are actuated for allowing security personnel to monitor the user. In an emergency, upon the actuation of the second activation mechanism, the alarm mechanism gives immediate indication of an emergency. In addition, the telecommunication mechanism alerts the official police of a possible crime. The audio monitoring mechanism allows the security personnel to listen to and record audio signals emitted in the vector path. Lastly, the lighting mechanism, mapping mechanism, and video monitoring are employed in a manner similar to a non-emergency situation. In any mode of operation, the processing mechanism utilizes the identification code transmitted to the processing mechanism for allowing the displaying of personal information relating to the user via the monitor or television screen.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A security tracking system comprising:
   transmitter means adapted to transmit a signal upon the actuation of an activation means by a user;
   antenna means adapted to receive the signal via free space;

receiver means coupled to the antenna means and adapted to generate discrete compass point data from the signal;

processing means connected to a coupling means, the coupling means adapted to accept the discrete compass point data from the receiver means and further allow the transmission thereof to the processing means, the processing means adapted to calculate from the discrete compass point data a location of the transmitter means; and said transmitter means further comprising a plurality of the activation means each adapted to selectively transmit a different signal whereby the user may select one of a plurality of different responses; and adjustable lighting means situated on an elevation means separate from the transmitter means for illuminating the location of the transmitter means upon actuation of the activation means.

2. A security tracking system comprising:

transmitter means adapted to transmit a signal upon the actuation of an activation means by a user;

antenna means adapted to receive the signal via free space;

receiver means coupled to the antenna means and adapted to generate discrete compass point data from the signal;

processing means connected to a coupling means, the coupling means adapted to accept the discrete compass point data from the receiver means and further allow the transmission thereof to the processing means, the processing means adapted to calculate from the discrete compass point data a location of the transmitter means; and adjustable lighting means situated on an elevation means separate from the transmitter means for illuminating the location of the transmitter means upon actuation of the activation means.

3. A security tracking system as set forth in claim 2 wherein the receiver means comprises:

a summer means operatively coupled to the antenna means and adapted to gauge the signal intensity and further generate a time dependent accumulation of signal intensities in the form of an analog signal, and a direction finding processor coupled to the summer, the direction finding processor adapted to sample the analog signal thereby providing the plurality of discrete compass point data.

4. A security tracking system as set forth in claim 2 and further comprising alarm means for emitting an audible alarm upon the actuation of the activation means.

5. A security tracking system as set forth in claim 2 and further comprising telecommunication means for dialing a designated number and further providing an audio message upon the actuation of the activation means.

6. A security tracking system as set forth in claim 2 wherein the transmitter means comprises a wrist watch for wearing by a user.

7. A security tracking system as set forth in claim 2 wherein the transmitter means comprises a pager for wearing by a user, wherein the activation means comprises a pull cord and associated switch adapted to actuate upon the removal thereof.

8. A security tracking system as set forth in claim 2 wherein the antenna means comprises a plurality of direction finding antennas each comprising of a plurality of dipoles operatively coupled in pairs, each pair connected to an impedance matching means for converting a first impedance of each dipole to a second lower impedance and further allowing the passage of the received signal therethrough.

9. A security tracking system as set forth in claim 2 wherein the coupling means comprises a plurality of serial input ports each with an associated driver operatively coupled thereto for allowing connecting with the processing means, each serial input port coupled to the receiver means.

10. A security tracking system as set forth in claim 9 and further comprising a mouse driver and an associated port for allowing the utilization of a conventional mouse.

11. A security tracking system as set forth in claim 2 wherein the coupling means comprises a modem with an associated driver operatively coupled thereto, the modem adapted to receive the discrete compass point data via free space from a transmitter coupled to the receiver means.

12. A security tracking system as set forth in claim 2 wherein the processing means is adapted to obviate erratic data from a predetermined array of the compass point data thus providing an accurate array, the processing means further adapted to average a plurality of the accurate arrays thereby affording a multiplicity of plot points defining a vector path for identifying the location of the transmitter means.

13. A security tracking system as set forth in claim 2 wherein the processing means is adapted to discontinue receipt of the compass point data upon the calculation of the location of the transmitter means and further a mapping means is included for continuously displaying a last calculated location of the transmitter means.

14. A security tracking system as set forth in claim 2 wherein the transmitter means is adapted to continuously transmit the signal upon the actuation of the activation means and further the processing means is adapted to continuously receive compass point data and continuously calculate the location of the transmitter means thereby allowing the tracking of the transmitter means upon the moving thereof.

15. A security tracking system as set forth in claim 2 and further comprising mapping means coupled to the processing means for viewing the location of the transmitter means.

16. A security tracking system as set forth in claim 2 wherein each transmitter includes a microphone for transmitting audio signals received therefrom via free space and further including audio monitoring means coupled to the processing means for listening to and recording audio signals generated in the vector path.

17. A security tracking system as set forth in claim 2 wherein the transmitter means comprises a plurality of transmitter modules each including a transmitter adapted to transmit a first radio frequency upon the actuation of a first activation means and a second radio frequency upon the actuation of a second activation means, wherein each module transmits an identification code upon the first actuation and second actuation thereof; and wherein the processing means is further adapted to identify via the identification code which transmitter module has actuated.

* * * * *